US009604638B2

(12) United States Patent
Kiyokawa et al.

(10) Patent No.: US 9,604,638 B2
(45) Date of Patent: Mar. 28, 2017

(54) PARKING ASSIST SYSTEM

(71) Applicants: AISIN SEIKI KABUSHIKI KAISHA, Kariya, Aichi-ken (JP); TOYOTA JIDOSHA KABUSHIKI KAISHA, Toyota, Aichi-ken (JP)

(72) Inventors: Yusuke Kiyokawa, Nagoya (JP); Masaya Kato, Toyokawa (JP); Tomohisa Yamashita, Toyohashi (JP); Tomoyuki Matsuba, Obu (JP); Hironobu Ishijima, Toyota (JP); Keisuke Oyama, Toyota (JP)

(73) Assignees: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/850,197

(22) Filed: Sep. 10, 2015

(65) Prior Publication Data

US 2016/0075328 A1    Mar. 17, 2016

(30) Foreign Application Priority Data

Sep. 12, 2014    (JP) ................................ 2014-186824

(51) Int. Cl.
*B60W 30/06* (2006.01)
*B62D 15/02* (2006.01)

(52) U.S. Cl.
CPC ......... *B60W 30/06* (2013.01); *B62D 15/0285* (2013.01); *B60W 2420/42* (2013.01); *B60W 2550/10* (2013.01); *B60W 2550/141* (2013.01)

(58) Field of Classification Search
CPC ............. B60W 30/06; B60W 2550/10; B60W 2550/141; B60W 2420/42; B62D 15/0285
USPC .......................................................... 701/41
See application file for complete search history.

(56) References Cited

U.S. PATENT DOCUMENTS

| 2010/0117812 A1* | 5/2010 | Laubinger | B60R 1/00 340/435 |
| 2014/0347469 A1* | 11/2014 | Zhang | B60R 1/00 348/118 |
| 2014/0347470 A1* | 11/2014 | Zhang | B60R 1/00 348/118 |

(Continued)

FOREIGN PATENT DOCUMENTS

DE    102010020135 A1    11/2011
JP    2007272276 A    10/2007

(Continued)

OTHER PUBLICATIONS

Communication dated Jul. 26, 2016, issued by the Japan Patent Office in corresponding Japanese Application No. 2014-186824.

*Primary Examiner* — McDieunel Marc
*Assistant Examiner* — James E Stroud
(74) *Attorney, Agent, or Firm* — Sughrue Mion, PLLC

(57) ABSTRACT

A parking assist system includes an electronic control unit. The electronic control unit is configured to detect an obstacle. The electronic control unit is configured to determine whether a vehicle is allowed to run over the obstacle. The electronic control unit is configured to, when it is determined that the vehicle is allowed to run over the obstacle, set a target position, to which the vehicle moves, to a position at which the vehicle overlaps with the obstacle.

20 Claims, 10 Drawing Sheets

(56) References Cited

U.S. PATENT DOCUMENTS

| | | | | |
|---|---|---|---|---|
| 2014/0347485 A1* | 11/2014 | Zhang | ............... | B60R 11/04 348/148 |
| 2015/0077560 A1* | 3/2015 | Zhang | ............... | G06T 3/4038 348/148 |
| 2015/0219760 A1 | 8/2015 | Hiramaki et al. | | |
| 2016/0207526 A1* | 7/2016 | Franz | ............... | G06K 9/00812 |

FOREIGN PATENT DOCUMENTS

| | | |
|---|---|---|
| JP | 2010-241320 A | 10/2010 |
| JP | 2014-058247 A | 4/2014 |
| JP | 2014101101 A | 6/2014 |

* cited by examiner

PARKING ASSIST SYSTEM

INCORPORATION BY REFERENCE

The disclosure of Japanese Patent Application No. 2014-186824 filed on Sep. 12, 2014 including the specification, drawings and abstract is incorporated herein by reference in its entirety.

BACKGROUND OF THE INVENTION

1. Field of the Invention

The invention relates to a parking assist system and a parking assist method.

2. Description of Related Art

A parking assist system for assisting in parking a vehicle may be implemented in the vehicle. The parking assist system, for example, sets a moving target position on the basis of another stopped vehicle or a partition line. The parking assist system guides the vehicle to the target position.

There may be an obstacle, such as a wall and a curb, near a parking space. There is also known a parking assist system that sets a target position while avoiding such an obstacle or informs a driver that there is an obstacle near (Japanese Patent Application Publication No. 2014-58247 (JP 2014-58247A)).

SUMMARY OF THE INVENTION

For example, depending on laws and regulations or transportation conditions, it may be required to park a vehicle over a curb. In this case, if the parking assist system sets a target position while avoiding the curb, it becomes difficult for a driver to park the vehicle in an appropriate place.

An aspect of the invention provides a parking assist system. The parking assist system includes an electronic control unit. The electronic control unit is configured to detect an obstacle. The electronic control unit is configured to determine whether a vehicle is allowed to run over the obstacle. The electronic control unit is configured to, when it is determined that the vehicle is allowed to run over the obstacle, set a target position, to which the vehicle moves, to a position at which the vehicle overlaps with the obstacle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
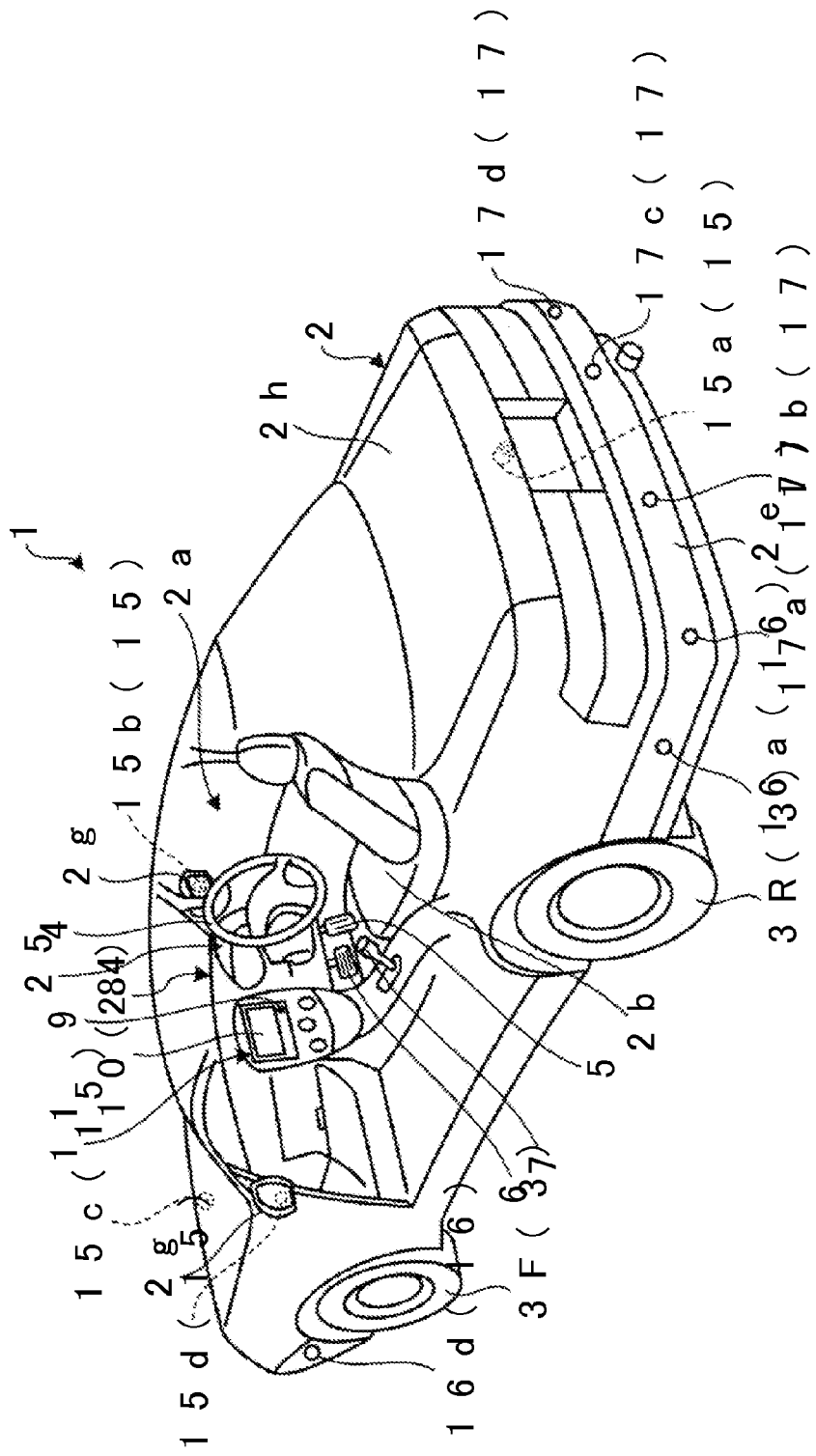

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
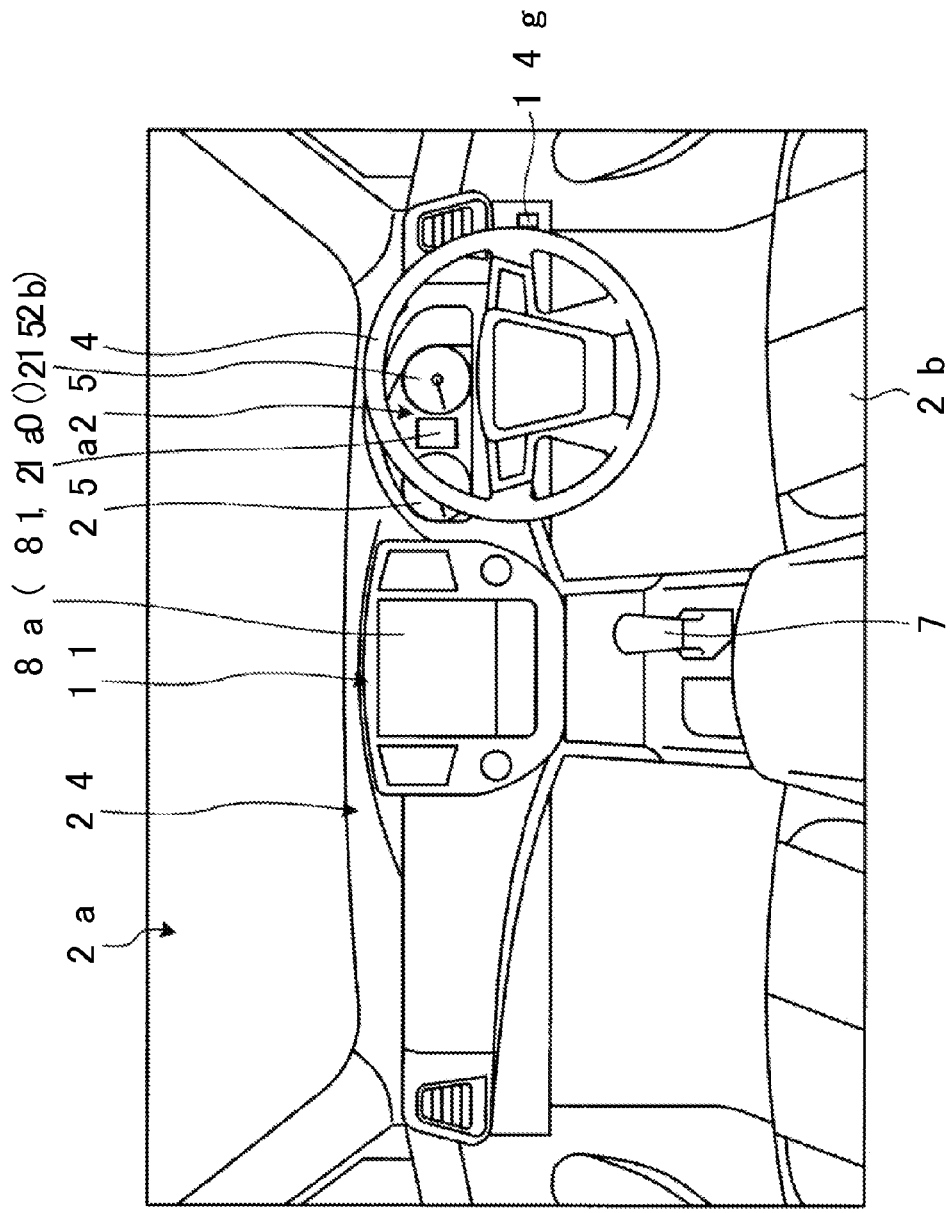
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a (FIG. 3) of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
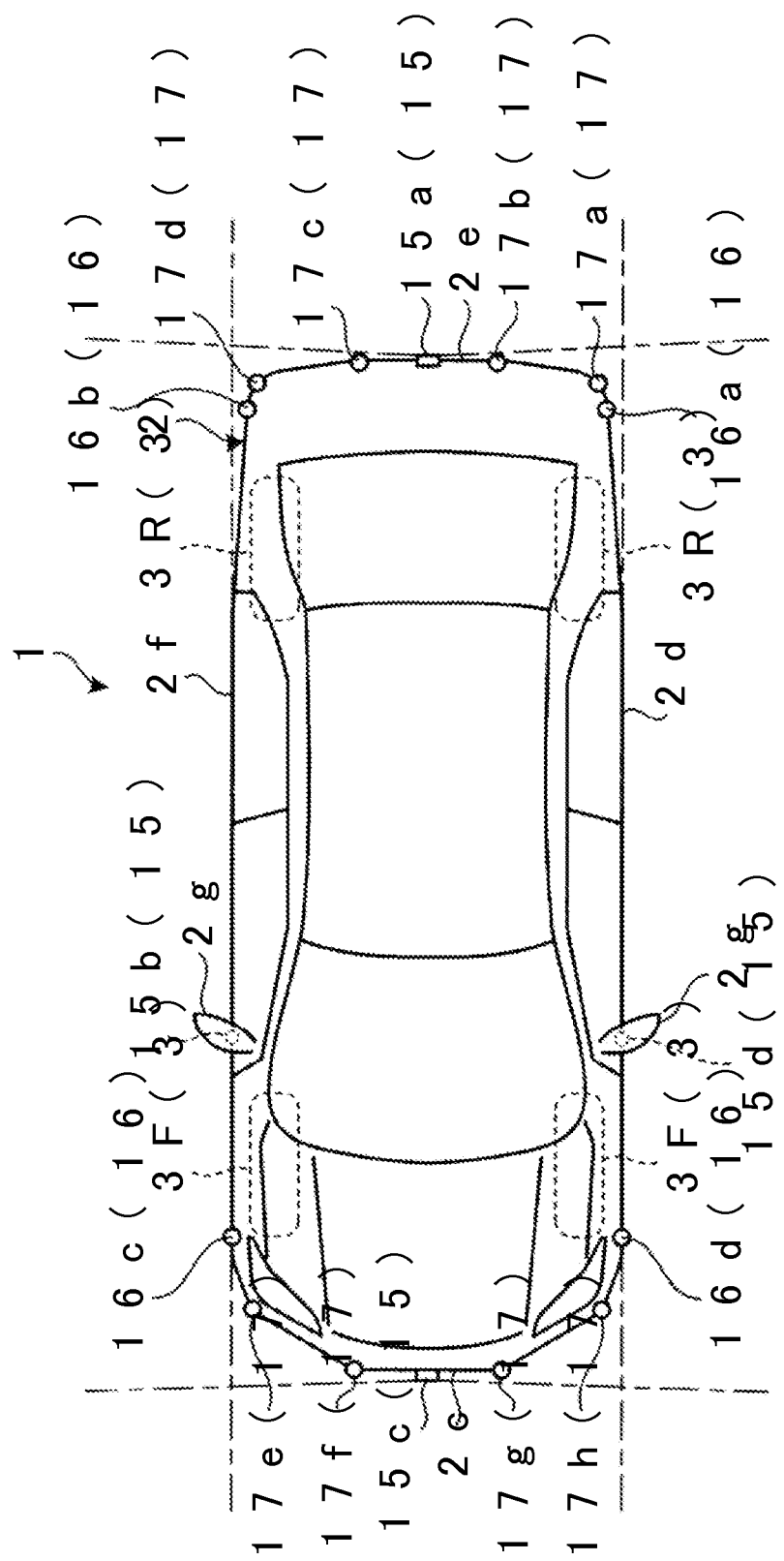
FIG. 2 is an exemplary plan view (bird's-eye view) of the vehicle according to the embodiment.
Figure 4:
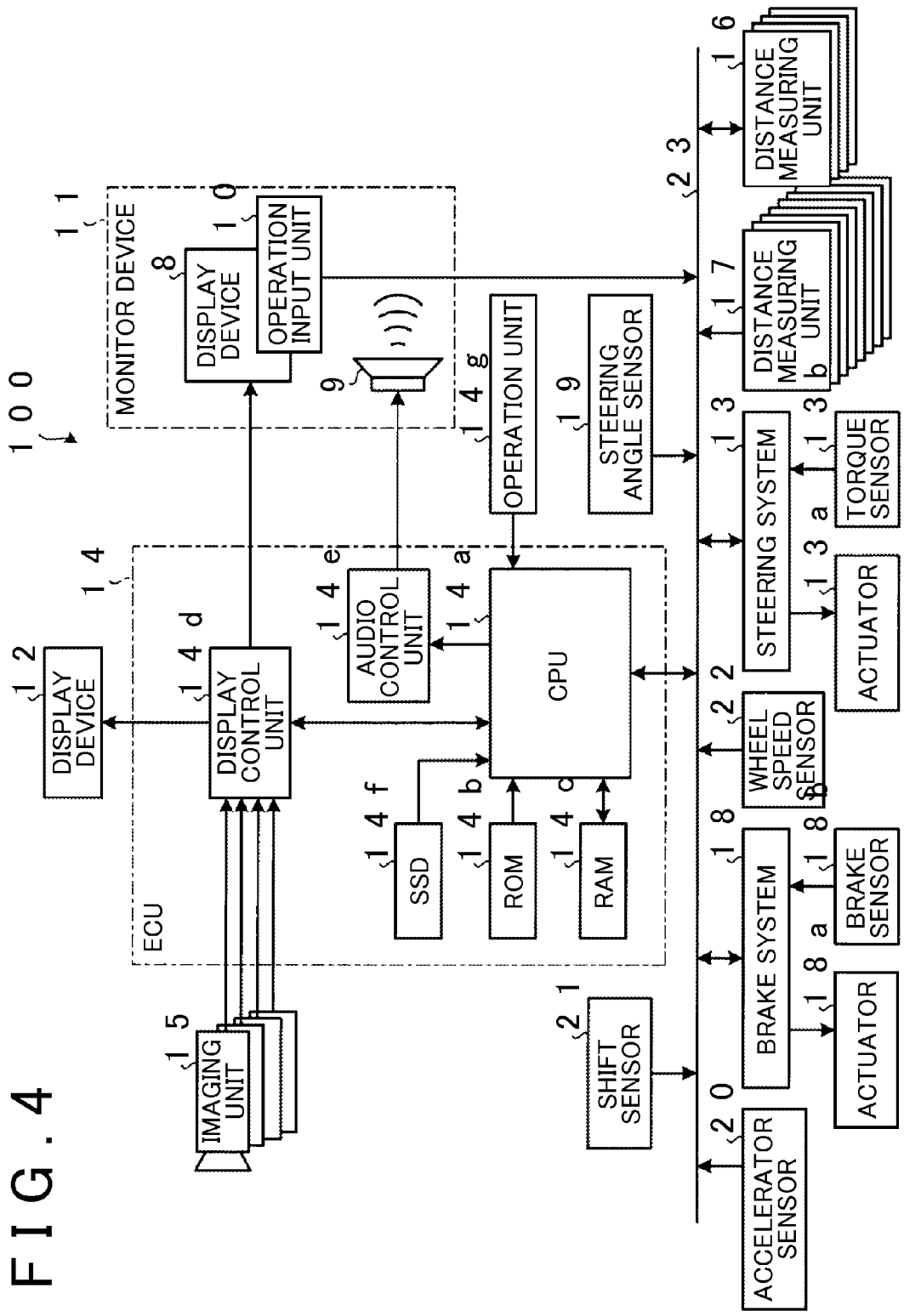
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable. As illustrated in FIG. 4, the vehicle 1 includes a steering system that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot. The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detected results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detected results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23. The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a moving target position of the vehicle 1, computation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and, by extension, the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, provided by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detected result of the wheel speed sensor 22 via the brake system 18.

The configurations, arrangement, electrical connection modes, and the like, of the above-described various sensors and actuators are illustrative, and may be variously set (changed).

Figure 5:
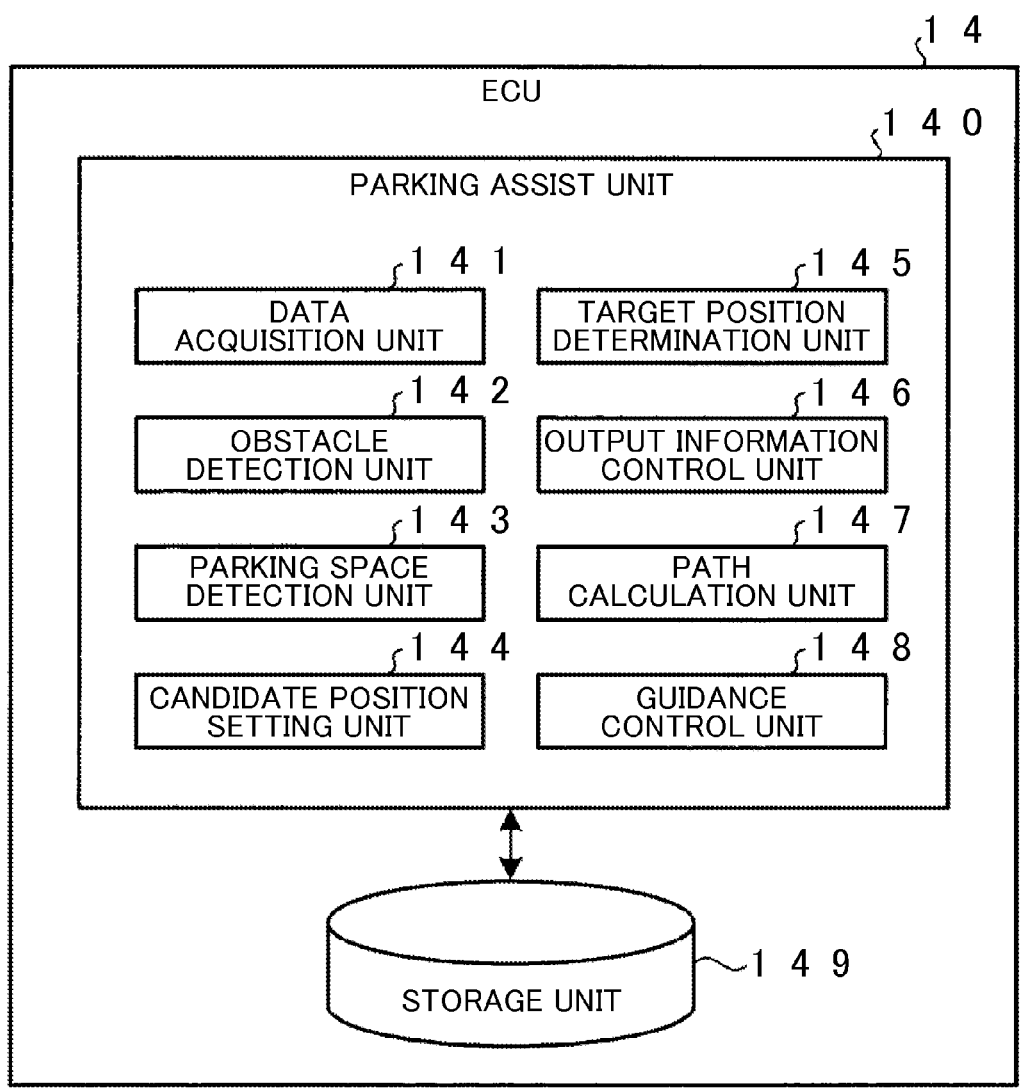
FIG. 5 is an exemplary block diagram of the configuration of an ECU of the parking assist system according to the embodiment.

Next, the configuration of a parking assist unit 140 that is implemented in the ECU 14 will be described. As shown in FIG. 5, the parking assist unit 140 includes a data acquisition unit 141, an obstacle detection unit 142, a parking space detection unit 143, a candidate position setting unit 144, a target position determination unit 145, an output information control unit 146, a path calculation unit 147, a guidance control unit 148, and the like. In addition, the ECU 14 includes a storage unit 149.

The components in the parking assist unit 140 shown in FIG. 5 are implemented when the CPU 14a of the ECU 14 shown in FIG. 4, for example, executes a parking assist program stored in the ROM 14b. That is, the parking assist unit 140 executes the parking assist program stored in the ROM 14b to implement the data acquisition unit 141, the obstacle detection unit 142, the parking space detection unit 143, the candidate position setting unit 144, the target position determination unit 145, the output information control unit 146, the path calculation unit 147, the guidance control unit 148, and the like. These components may be configured to be implemented by hardware. The storage unit 149 is, for example, implemented by the RAM 14c or the SSD 14f.

The data acquisition unit 141 acquires various pieces of information, such as detected results of the sensors and distance measuring units 16, 17, image data obtained by the imaging units 15 and signals input through operation of the operation input unit 10, the operation unit 14g, and the like. The operation unit 14g is, for example, a push button, a switch, or the like. The obstacle detection unit 142 detects an obstacle on the basis of information acquired by the data acquisition unit 141. The parking space detection unit 143 detects a parking space on the basis of information acquired by the data acquisition unit 141. The candidate position setting unit 144 sets a candidate position of the moving target position of the vehicle 1. The target position determination unit 145 determines the moving target position of the vehicle 1. The output information control unit 146 determines information that is output through the display device 12, the display device 8, the audio output device 9, such as a speaker, or the like, an output mode of the information, and the like. The path calculation unit 147 calculates a moving path to the moving target position of the vehicle 1. The guidance control unit 148 controls the portions of the vehicle 1 such that the vehicle 1 moves to the moving target position along the moving path. The storage unit 149 stores data that are used in computation in the ECU 14 or data calculated in computation in the ECU 14.

Figure 6:
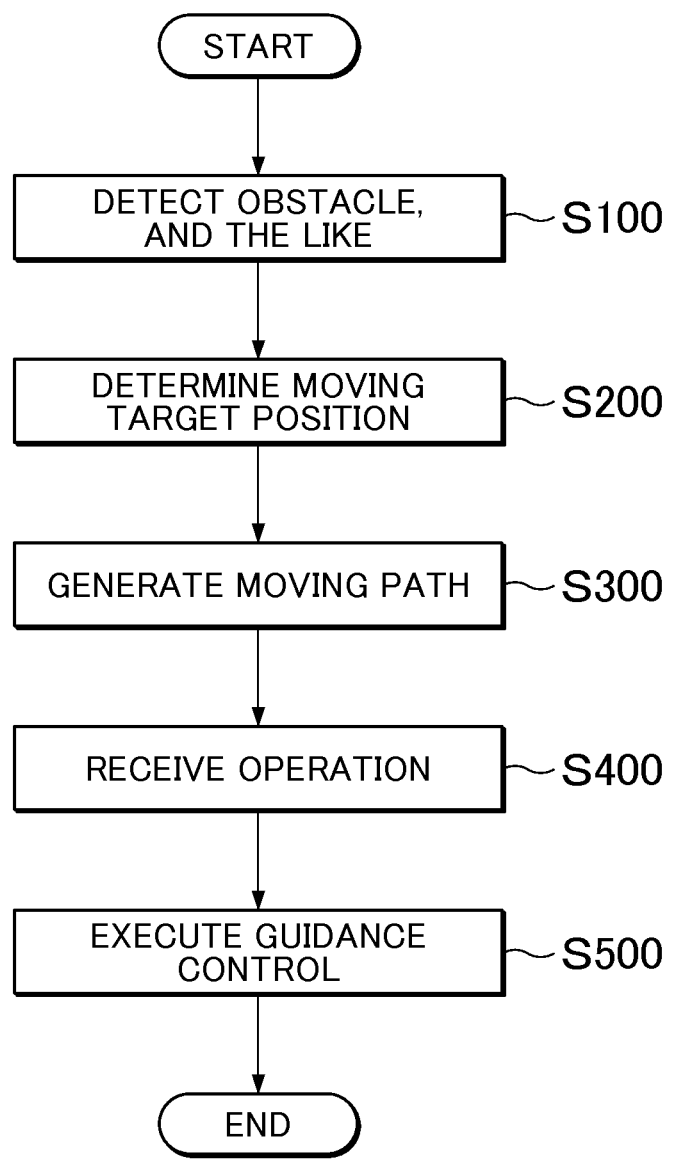
FIG. 6 is an exemplary flowchart of the procedure of a parking assist process that is executed by a parking assist unit according to the embodiment.

Next, an example of a parking assist process that is executed by the parking assist unit 140 according to the present embodiment will be schematically described. The parking assist process that will be described below is one example, and may be partially omitted or modified. FIG. 6 is a flowchart that shows an example of the procedure of the parking assist process that is executed by the parking assist unit 140.

Initially, while the vehicle 1 is moving, the parking assist unit 140 detects a vehicle (stopped vehicle) stopped around the vehicle 1, an obstacle, such as a curb, a partition line, or the like (S100). For example, the obstacle detection unit 142 detects a stopped vehicle or an obstacle on the basis of detected results of the distance measuring units 16, 17, acquired by the data acquisition unit 141, or image data obtained by the imaging units 15. The parking space detection unit 143 detects a parking space on the basis of the detected stopped vehicle, obstacle, partition line, or the like. An obstacle, or the like, may be constantly detected or may be detected, for example, when the speed of the vehicle 1 is lower than a preset value. Detection of an obstacle, or the like, may be started after a driver operates the operation unit 14g.

Subsequently, the parking assist unit 140 determines the moving target position of the vehicle 1 (S200). For example, the candidate position setting unit 144 sets at least one candidate position on the basis of the detected stopped vehicle, and the like, and the detected parking space. The target position determination unit 145 determines at least one moving target position of the vehicle 1 from among the at least one candidate position.

Subsequently, the parking assist unit 140 generates a moving path of the vehicle 1 (S300). For example, the path calculation unit 147 generates at least one moving path to the determined moving target position. For example, the path calculation unit 147 respectively generates moving paths for moving the vehicle 1 to the moving target position by front-end parking, double parking and parallel parking.

Subsequently, the parking assist unit 140 receives an input operation to select or determine a parking assist function (S400). For example, when the driver operates the operation unit 14g, the output information control unit 146 that has acquired an input signal of that operation via the data acquisition unit 141 causes the screen 12a of the display device 12 or the screen 8a of the display device 8 to display a screen for selecting the parking assist function. For example, the driver selects the parking assist function for any one of front-end parking, double parking and parallel parking. When the driver determines the parking assist function, the parking assist function starts.

Subsequently, the parking assist unit 140 executes guidance control over the vehicle 1 on the basis of the selected parking assist function (S500). For example, the guidance control unit 148 controls the steering system 13 on the basis of the parking assist function selected by the driver, and automatically steers the wheels 3, thus assisting in parking the vehicle 1 (automatic steering). When the driver operates the accelerator operation unit 5, the brake operation unit 6 or the shift operation unit 7, the vehicle 1 moves to the moving target position along the moving path corresponding to the selected parking assist function. When a distance between the vehicle 1 and the moving target position falls within a predetermined value, guidance control ends. When a predetermined operation is performed on the steering unit 4, the accelerator operation unit 5, the brake operation unit 6 or the shift operation unit 7 as well, guidance control ends (guidance control is cancelled). During guidance control, the target position determination unit 145 and the path calculation unit 147 may reset the moving target position and moving path of the vehicle 1 in response to a situation.

The guidance control unit 148 may assist in parking the vehicle 1 by automatically operating not only the steering system 13 but also the accelerator operation unit 5, the brake operation unit 6 and the shift operation unit 7 (automatic operation). The parking assist unit 140 may assist driver's operation in parking the vehicle by displaying the moving target position or the moving path on the display device 12 at the time when the vehicle 1 is moved to be parked (steering guidance).

In the above-described parking assist process, for example, the target position determination unit 145 may determine the moving target position without utilizing the candidate position set by the candidate position setting unit 144. After the parking assist unit 140 receives an input operation to select and determine the parking assist function (S400), the parking assist unit 140 may determine the moving target position and generate the moving path (S200, S300).

Figure 7:
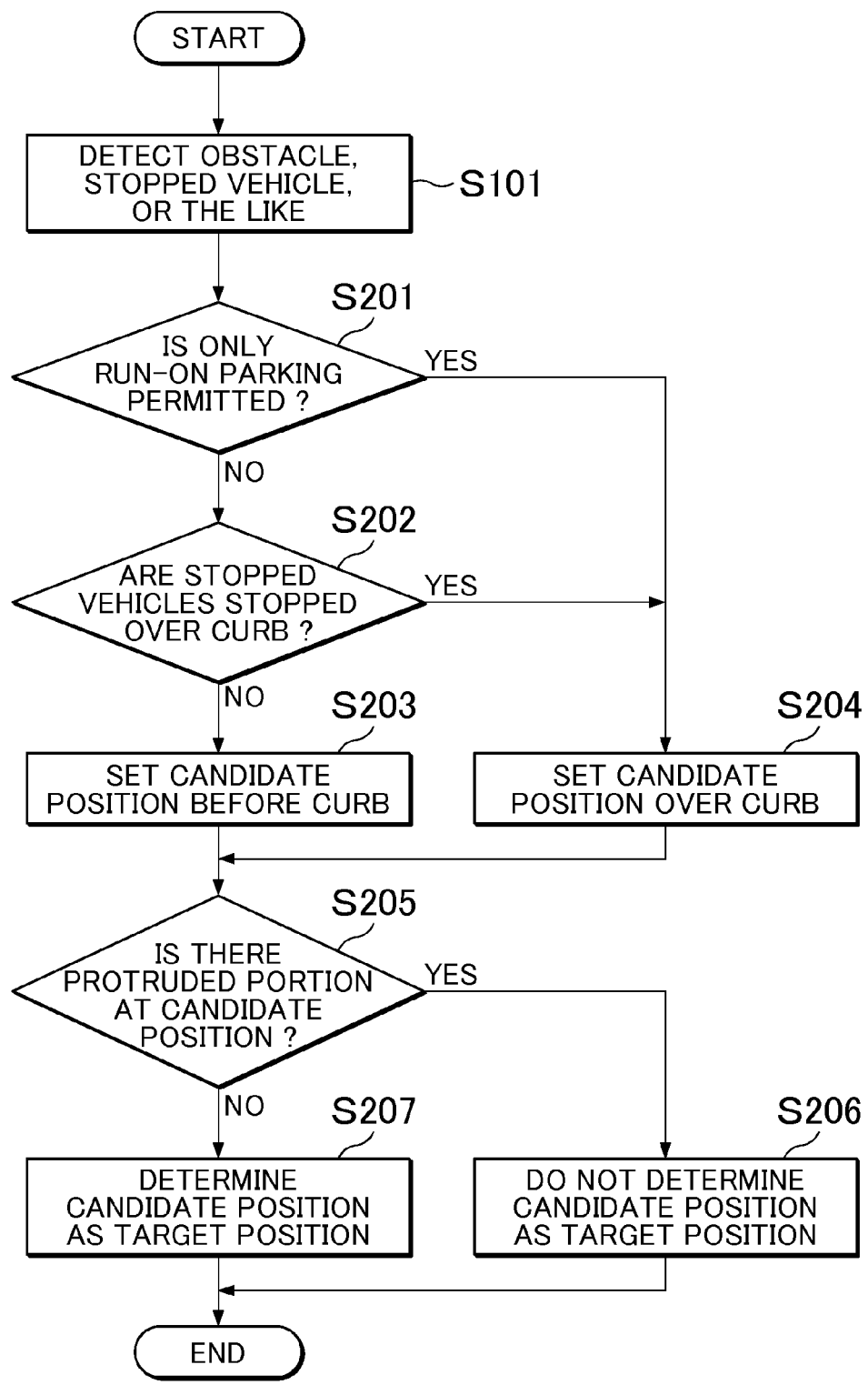
FIG. 7 is an exemplary flowchart that shows an example of the procedure of a process of determining a moving target position, which is executed by the parking assist unit according to the embodiment.
Figure 8:
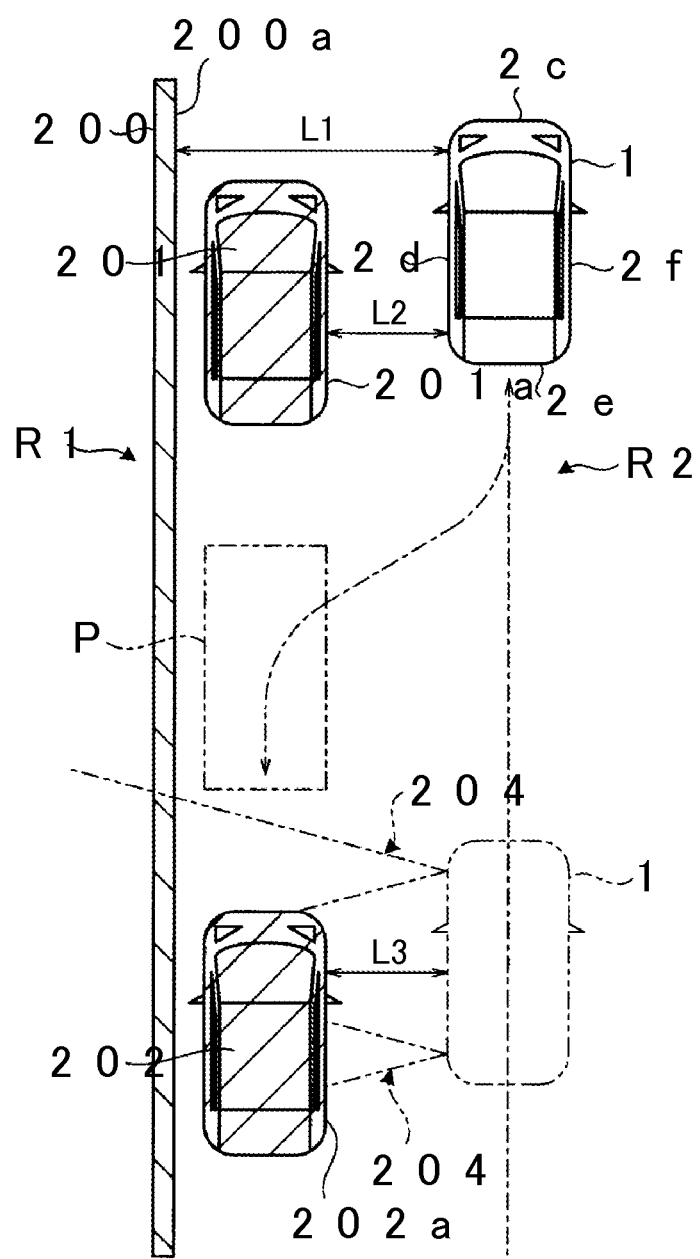
FIG. 8 is an exemplary plan view that schematically shows a first example of a vehicle that parallel parks according to the embodiment.

Hereinafter, determination of the moving target position, which is performed by the parking assist unit 140, will be described in detail. FIG. 7 is a flowchart that shows an example of the procedure of a process of determining the moving target position, which is executed by the parking assist unit 140. FIG. 8 is a plan view that schematically shows a first example of the vehicle 1 that parallel parks.

As shown in FIG. 8, when a stopped vehicle 201 ahead and a stopped vehicle 202 behind are stopped along a curb 200, the parking assist unit 140 is able to execute a parallel parking assist function for parallel parking the vehicle 1 between the stopped vehicle 201 ahead and the stopped vehicle 202 behind. The curb 200 is, for example, a block that separates a sidewalk R1 and a roadway R2 from each other, and provides a step between the sidewalk R1 and the roadway R2. The sidewalk R1 is continuous with the curb 200, and is higher than the roadway R2. The stopped vehicle 201 ahead is another vehicle that is stopped (parked) ahead of the stopped vehicle 202 behind in the traveling direction of the vehicle 1. The stopped vehicle 202 behind is another vehicle that is stopped (parked) behind the stopped vehicle 201 ahead in the traveling direction of the vehicle 1. The stopped vehicle 201 ahead and the stopped vehicle 202 behind may be placed at an angle with respect to the curb 200.

Parallel parking in the present embodiment is a parking method for reversing the vehicle 1 and parking the vehicle 1 such that the vehicle 1 is aligned with another vehicle, such as the stopped vehicle 201 ahead and the stopped vehicle 202 behind. FIG. 8 shows an example of the moving path of the vehicle 1 traveling forward on the roadway R2 and an example of the moving path of the vehicle 1 that parallel parks by the alternate long and short dash lines. Parallel parking provided by the parallel parking assist function that is executable by the parking assist unit 140 is not limited to this mode.

The vehicle 1 moves forward and passes by the stopped vehicle 201 ahead and the stopped vehicle 202 behind. While the vehicle 1 is traveling, the distance measuring units 16 respectively emit ultrasonic waves 204 from the side of the vehicle 1 at constant time intervals, and capture reflected waves of the ultrasonic waves 204. FIG. 8 schematically shows ranges to which the ultrasonic waves 204 are emitted by the alternate long and two-short dashes lines. The obstacle detection unit 142 detects an object to the side of the vehicle 1, such as the curb 200, the stopped vehicle 201 ahead and the stopped vehicle 202 behind, on the basis of the detected results of the distance measuring units 16, acquired by the data acquisition unit 141 (S101).

The vehicle 1 travels along the curb 200. Therefore, when a distance between the vehicle 1 and the curb 200 falls within a range in which an object is detectable by the distance measuring units 16, the obstacle detection unit 142 detects the curb 200. The obstacle detection unit 142 is an example of the detection unit, and the curb 200 is an example of an obstacle.

When the vehicle 1 passes by the side of the stopped vehicle 202 behind, the obstacle detection unit 142 detects the stopped vehicle 202 behind. When the vehicle 1 passes by the side of the stopped vehicle 201 ahead, the obstacle detection unit 142 detects the stopped vehicle 201 ahead.

More specifically, for example, the obstacle detection unit 142 acquires a distance between the vehicle 1 and an object, such as the curb 200, which is a detected result of the distance measuring units 16, from the data acquisition unit 141. The obstacle detection unit 142 stores the detected results of the distance measuring units 16 and times at which the results are acquired, in the storage unit 149 in association with each other.

The obstacle detection unit 142 generates data of a plan view in which coordinates of an outer periphery of the detected object are plotted by the use of the detected results of the distance measuring units 16 and the times at which the results are acquired. The obstacle detection unit 142 determines that there is an object, such as the curb 200, the stopped vehicle 201 ahead and the stopped vehicle 202 behind, in a place in which the coordinates of the outer periphery of the object are linearly continuous. A method of detecting the curb 200, the stopped vehicle 201 ahead, or the stopped vehicle 202 behind with the use of the obstacle detection unit 142 is not limited to this configuration.

Subsequently, the candidate position setting unit 144 determines whether a road on which the vehicle 1 is traveling is a zone in which only one-side run-on parking is permitted (S201). For example, a zone in which only one-side run-on parking is permitted may be set. The one-side run-on parking is that the vehicle 1 is parked in a state where only one-side front wheel 3F and rear wheel 3R of the vehicle 1 run on a sidewalk. In this zone, when the vehicle 1 is parked in a state where all the wheels 3 are located on the roadway R2 or the sidewalk R1, the vehicle 1 may be illegally parked.

The candidate position setting unit 144, for example, detects a road sign on the basis of image data obtained by the imaging units 15 while the vehicle 1 is traveling. When the candidate position setting unit 144 has detected a road sign that indicates the zone in which only one-side run-on parking is permitted, the candidate position setting unit 144 determines that the road on which the vehicle 1 is traveling is the zone in which only one-side run-on parking is permitted (Yes in S201). Not limited to this configuration, the candidate position setting unit 144 may acquire information as to whether the road on which the vehicle 1 is traveling is the zone in which only one-side run-on parking is permitted from a car navigation system or a server via the Internet, or the like.

There is a case where the zone in which only one-side run-on parking is permitted is not determined or a case where it is not clear whether it is the zone in which only one-side run-on parking is permitted. For example, in such a case, the candidate position setting unit 144 determines that the road on which the vehicle 1 is traveling is not the zone in which only one-side run-on parking is permitted (No in S201).

Initially, the case where the candidate position setting unit 144 determines that the road on which the vehicle 1 is traveling is not the zone in which only one-side run-on parking is permitted (No in S201) will be described. In this case, the candidate position setting unit 144 determines whether the stopped vehicle 201 ahead and the stopped vehicle 202 behind are stopped over the curb 200 (S202). In other words, the candidate position setting unit 144 determines whether another vehicle has run over the curb 200.

The candidate position setting unit 144, for example, calculates a difference between a distance L1 between the vehicle 1 and the curb 200, detected by the distance measuring units 16, and a distance L2 between the vehicle 1 and the stopped vehicle 201 ahead, detected by the distance measuring units 16. In other words, the candidate position setting unit 144 calculates a distance between a side end 200a of the curb 200 and a side end 201a of the stopped vehicle 20a ahead in a direction that intersects with a direction in which the curb 200 extends.

The width of a standard vehicle is stored in the storage unit 149 in advance. The width of the standard vehicle is, for example, approximately equal to the width of the vehicle 1. When the difference between the distance L1 between the vehicle 1 and the curb 200 and the distance L2 between the vehicle 1 and the stopped vehicle 201 ahead is larger than the width of the standard vehicle, the candidate position setting unit 144 determines that the stopped vehicle 201 ahead is stopped at a position out of the curb 200 (No in S202).

Similarly, the candidate position setting unit 144 calculates a difference between the distance between the vehicle 1 and the curb 200, detected by the distance measuring units 16, and a distance L3 between the vehicle 1 and the stopped vehicle 202 behind, detected by the distance measuring units 16. In other words, the candidate position setting unit 144 calculates a distance between the side end 200a of the curb 200 and a side end 202a of the stopped vehicle 202 behind in the direction that intersects with the direction in which the curb 200 extends. When the difference between the distance L1 between the vehicle 1 and the curb 200 and the distance L3 between the vehicle 1 and the stopped vehicle 202 behind is larger than the width of the standard vehicle, the candidate position setting unit 144 determines that the stopped vehicle 202 behind is stopped at a position out of the curb 200.

When the candidate position setting unit 144 determines that the stopped vehicle 201 ahead and the stopped vehicle 202 behind are respectively stopped at the positions out of the curb 200, the candidate position setting unit 144 sets a candidate position P of the moving target position before the curb 200 (on the roadway R2 side of the curb 200) (S203). The candidate position P that is set before the curb 200 is located at a position out of the curb 200. When the candidate position setting unit 144 determines that one of the stopped vehicle 201 ahead and the stopped vehicle 202 behind is stopped at a position out of the curb 200, the candidate position setting unit 144 may set the candidate position P before the curb 200.

Figure 9:
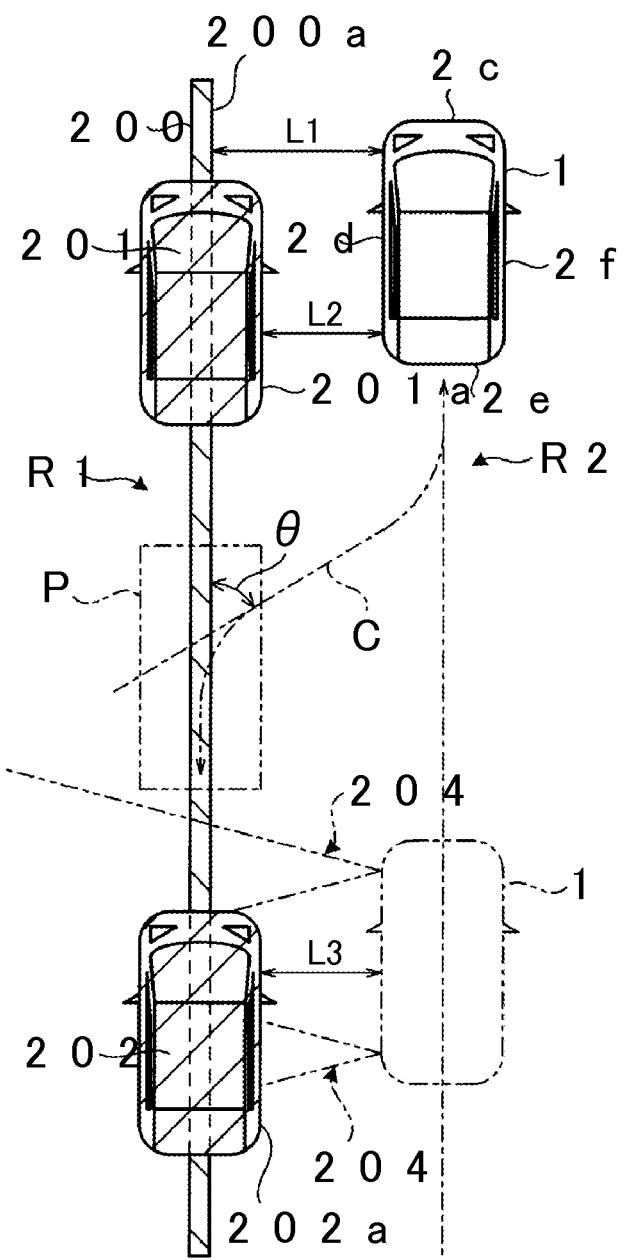
FIG. 9 is an exemplary plan view that schematically shows a second example of a vehicle that parallel parks according to the embodiment.

FIG. 9 is a plan view that schematically shows a second example of the vehicle 1 that parallel parks. As shown in FIG. 9, there is a case where the stopped vehicle 201 ahead or the stopped vehicle 202 behind runs over the curb 200 to make one-side run-on parking.

In the second example shown in FIG. 9, the difference between the distance L1 between the vehicle 1 and the curb 200 and the distance L2 between the vehicle 1 and the stopped vehicle 201 ahead is smaller than the width of the standard vehicle. In this case, the candidate position setting unit 144 determines that the stopped vehicle 201 ahead is stopped over the curb 200 (Yes in S202). In other words, the candidate position setting unit 144 determines that the stopped vehicle 201 ahead is stopped at a position at which the stopped vehicle 201 ahead overlaps with the curb 200.

Similarly, when the difference between the distance L1 between the vehicle 1 and the curb 200 and the distance L3 between the vehicle 1 and the stopped vehicle 202 behind is smaller than the width of the standard vehicle, the candidate position setting unit 144 determines that the stopped vehicle 202 behind is stopped over the curb 200.

When the candidate position setting unit 144 determines that the stopped vehicle 201 ahead and the stopped vehicle 202 behind are respectively stopped at the positions at which the stopped vehicle 201 ahead and the stopped vehicle 202 behind overlap with the curb 200, the candidate position setting unit 144 sets the candidate position P over the curb 200 (S204). In other words, the candidate position setting unit 144 sets the candidate position P at a position at which the vehicle 1 overlaps with the curb 200. When the candidate position setting unit 144 determines that one of the stopped vehicle 201 ahead and the stopped vehicle 202 behind is stopped over the curb 200, the candidate position setting unit 144 may set the candidate position P over the curb 200.

On the other hand, when the candidate position setting unit 144 determines that the road on which the vehicle 1 is traveling is the zone in which only one-side run-on parking is permitted (Yes in S201), the candidate position setting unit 144 sets the candidate position P over the curb 200 (S204). That is, when the road on which the vehicle 1 is traveling is the zone in which only one-side run-on parking is permitted, the candidate position setting unit 144 omits determination of the stopped positions of the stopped vehicle 201 ahead and stopped vehicle 202 behind. The candidate position setting unit 144 is not limited to this configuration.

Figure 10:
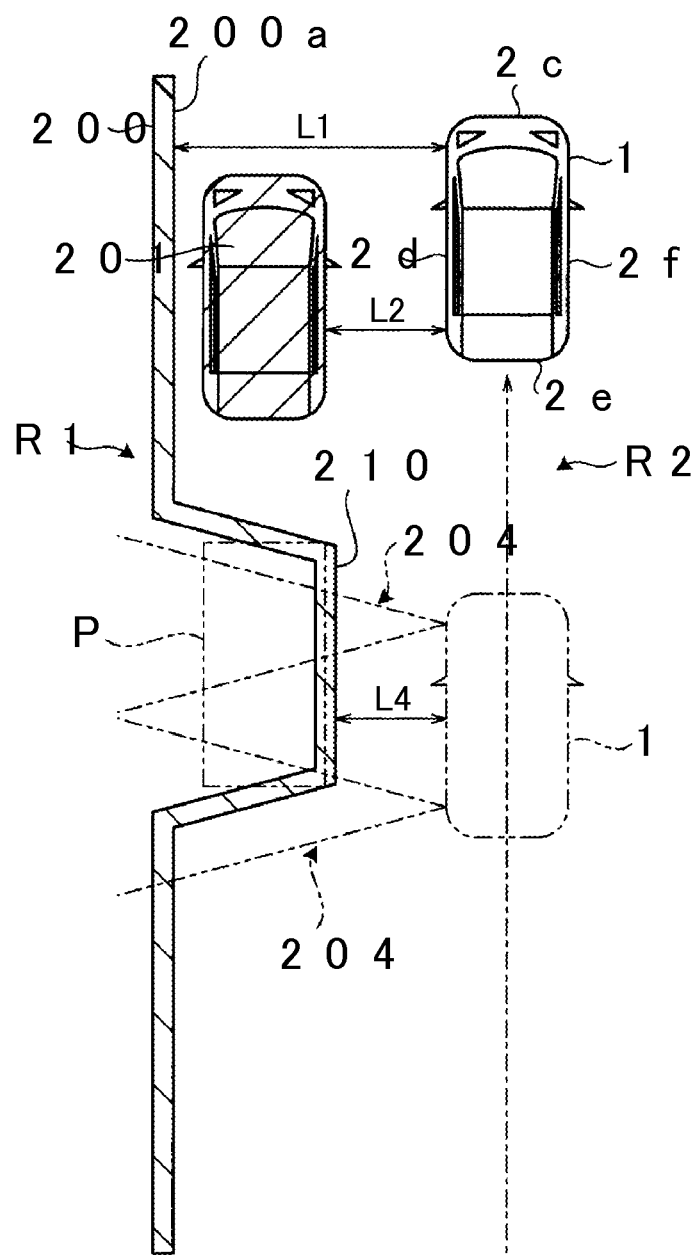
FIG. 10 is an exemplary plan view that schematically shows a third example of a vehicle that parallel parks according to the embodiment.

FIG. 10 is a plan view that schematically shows a third example of the vehicle 1 that parallel parks. As shown in FIG. 10, the curb 200 may have a protruded portion 210. The protruded portion 210 is a jetty portion of the sidewalk R1, and is, for example, a portion on which a utility pole or a street light is arranged or by which an on-street parking place is partitioned. If the vehicle 1 stops on the protruded portion 210 of the curb 200, the vehicle 1 may collide with a utility pole or a street light or the vehicle 1 may stop at a position out of a parking space of the on-street parking place.

The target position determination unit 145 determines whether there is the above-described protruded portion 210 of the curb 200 at the candidate position P set by the candidate position setting unit 144 (S205). For example, the obstacle detection unit 142 detects the continuous curb 200 on the basis of the detected results of the distance measuring units 16. As described above, the obstacle detection unit 142 continuously stores the detected results (history) of the distance measuring units 16 in the storage unit 149.

When a distance between the vehicle 1 and the curb 200, which is obtained from the detected results of the distance measuring units 16, reduces from the distance L1 to a distance L4, the obstacle detection unit 142 determines that the curb 200 has the protruded portion 210. Specifically, when the difference between the distance L4 between the vehicle 1 and the protruded portion 210 and the distance L1 between the vehicle 1 and another portion of the curb 200 is larger than a threshold stored in the storage unit 149 in advance, the obstacle detection unit 142 determines that the curb 200 has the protruded portion 210. The target position determination unit 145 determines whether the protruded portion 210 detected by the obstacle detection unit 142 and the candidate position P set by the candidate position setting unit 144 overlap with each other.

As in the third example shown in FIG. 10, when the target position determination unit 145 determines that there is the protruded portion 210 of the curb 200 at the candidate position P (Yes in S205), the target position determination unit 145 dose not determine the moving target position of the vehicle 1 at the candidate position P (S206). In this case, the candidate position setting unit 144, for example, shifts the candidate position P or sets another candidate position between other vehicles.

On the other hand, as in the second example shown in FIG. 8, when the target position determination unit 145 determines that there is no protruded portion 210 of the curb 200 at the candidate position P (No in S205), the target position determination unit 145 determines the moving target position of the vehicle 1 at the candidate position P (S207).

As described above, when the candidate position setting unit 144 determines that the stopped vehicle 201 ahead and the stopped vehicle 202 behind are respectively stopped at the positions at which the stopped vehicle 201 ahead and the stopped vehicle 202 behind overlap with the curb 200, the target position determination unit 145 sets the moving target position to the position at which the vehicle 1 overlaps with the curb 200. On the other hand, when the candidate position setting unit 144 determines that the stopped vehicle 201 ahead and the stopped vehicle 202 behind are respectively stopped at the positions out of the curb 200, the target position determination unit 145 sets the moving target position at the position out of the curb 200.

When the stopped vehicle 201 ahead or the stopped vehicle 202 behind is stopped over the curb 200, there is a high possibility that the vehicle 1 is allowed to run over the curb 200. That is, the candidate position setting unit 144 determines whether the vehicle 1 is allowed to run over the curb 200 on the basis of a relative position between both the stopped vehicle 201 ahead and the stopped vehicle 202 behind and the curb 200. When the candidate position setting unit 144 determines that the vehicle 1 is allowed to run over the curb 200, the target position determination unit 145 sets the moving target position to the position at which the vehicle 1 overlaps with the curb 200.

In addition, when the candidate position setting unit 144 determines that the vehicle 1 is located in a place in which only one-side run-on parking, in which the vehicle 1 overlaps with the curb 200, is permitted, the target position determination unit 145 sets the moving target position to the position at which the vehicle 1 overlaps with the curb 200.

Hereinafter, generation of a moving path of the vehicle 1 by the path calculation unit 147 in the case where the moving target position is determined at a position at which the vehicle 1 overlaps with the curb 200 will be described. As in the second example shown in FIG. 9, when the moving target position (candidate position P) is determined at the position at which the vehicle 1 overlaps with the curb 200, the path calculation unit 147 calculates a moving path C to the moving target position of the vehicle 1. The moving path C is a path for parallel parking the vehicle 1 at the moving target position, and is formed of a straight line, a curve and a circular arc. The moving path C is not limited to this configuration. The moving path C may be a path accompanied by maneuvering the steering wheel by using forward and reverse gears.

The path calculation unit 147 calculates the moving path C along which the wheels 3 of the vehicle 1 are steered at a position spaced apart from the curb 200. That is, at the time when the vehicle 1 moves along the moving path C, the steering unit 4 steers the wheels 3 only when the wheels 3 are spaced apart from the curb 200.

In addition, the path calculation unit 147 calculates the moving path C such that an angle θ between the traveling direction of the wheels 3 and the direction in which the curb 200 extends falls within a predetermined range at the time when the wheels 3 run over the curb 200. For example, the path calculation unit 147 calculates the moving path C such that the angle θ falls within the range of 60° to 90°. Thus, the wheels 3 are able to easily run over the curb 200. The moving path C is not limited to this configuration.

In the above embodiment, when the candidate position setting unit 144 determines that the vehicle 1 is allowed to run over the curb 200, the target position determination unit 145 is allowed to set the moving target position to the position at which the vehicle 1 overlaps with the curb 200. Thus, for example, when it is permitted to stop the vehicle over the curb 200, the target position determination unit 145 is able to set the moving target position to a further appropriate position.

When the candidate position setting unit 144 determines that the stopped vehicle 201 ahead and the stopped vehicle 202 behind are respectively stopped at the positions at which the stopped vehicle 201 ahead and the stopped vehicle 202 behind overlap with the curb 200, the target position determination unit 145 sets the moving target position to the position at which the vehicle 1 overlaps with the curb 200. Thus, the target position determination unit 145 is able to set the moving target position to a further appropriate position in coordination with other stopped vehicles.

When the candidate position setting unit 144 determines that the stopped vehicle 201 ahead and the stopped vehicle 202 behind are respectively stopped at the positions out of the curb 200, the target position determination unit 145 sets the moving target position to the position out of the curb 200. Thus, the target position determination unit 145 is able to set the moving target position to a further appropriate position in coordination with other stopped vehicles.

The target position determination unit 145 sets the moving target position such that the vehicle 1 is stopped in tandem with the stopped vehicle 201 ahead and the stopped vehicle 202 behind. That is, the target position determination unit 145 sets the moving target position for parallel parking. Therefore, the distance between the vehicle 1 and the curb 200 is short, so the obstacle detection unit 142 easily detects the curb 200.

When the candidate position setting unit 144 determines that the vehicle 1 is located in a place in which the vehicle 1 is allowed to stop at a position at which the vehicle 1 overlaps with the curb 200, the target position determination unit 145 sets the moving target position to the position at which the vehicle 1 overlaps with the curb 200. Thus, for example, in a place in which there is a road sign that indicates a zone in which only one-side run-on parking is permitted, the target position determination unit 145 is able to set the moving target position to a further appropriate position.

When the moving target position is set to the position at which the vehicle 1 overlaps with the curb 200, the path calculation unit 147 sets the moving path C such that the wheels 3 are steered at a position out of the curb 200. Thus, for example, a situation that the wheels 3 become unsteerable as a result of contacting the curb 200 during dry steering or a situation that the wheels 3 on the curb 200 drop when steered is prevented.

In the above embodiment, a parking assist method includes: detecting the curb 200; determining whether the vehicle 1 is allowed to run over the curb 200; and, when it is determined that the vehicle 1 is allowed to run over the curb 200, setting a moving target position of the vehicle 1 to a position at which the vehicle 1 overlaps with the curb 200. Thus, for example, it is possible to set the moving target position to a further appropriate position.

The above-described embodiment of the invention does not limit the scope of the invention, and is just one example that is included in the scope of the invention. For example, at least part of specific application, structure, shape, operation and advantageous effect of the above-described embodiment of the invention may be modified, omitted or added without departing from the spirit of the invention.

What is claimed is:

1. A parking assist system comprising:
   an electronic control unit configured to
      detect an obstacle,
      determine whether a vehicle is allowed to run over the obstacle, and
      when it is determined that the vehicle is allowed to run over the obstacle, set a target position, to which the vehicle moves, to a position at which the vehicle overlaps with the obstacle.

2. The parking assist system according to claim 1, wherein
   the electronic control unit is configured to detect another stopped vehicle,
   the electronic control unit is configured to determine whether the other vehicle is stopped at a position at which the other vehicle overlaps with the obstacle, and
   the electronic control unit is configured to, when it is determined that the other vehicle is stopped at the position at which the other vehicle overlaps with the obstacle, set the target position to the position at which the vehicle overlaps with the obstacle.

3. The parking assist system according to claim 1, wherein
   the electronic control unit is configured to determine whether another vehicle is stopped at a position out of the obstacle, and
   the electronic control unit is configured to, when it is determined that the other vehicle is stopped at the position out of the obstacle, set the target position to a position out of the obstacle.

4. The parking assist system according to claim 2, wherein
   the electronic control unit is configured to determine whether another vehicle is stopped at a position out of the obstacle, and
   the electronic control unit is configured to, when it is determined that the other vehicle is stopped at the position out of the obstacle, set the target position to a position out of the obstacle.

5. The parking assist system according to claim 2, wherein
   the electronic control unit is configured to set the target position such that the vehicle is stopped in tandem with the other vehicle.

6. The parking assist system according to claim 3, wherein
   the electronic control unit is configured to set the target position such that the vehicle is stopped in tandem with the other vehicle.

7. The parking assist system according to claim 4, wherein
   the electronic control unit is configured to set the target position such that the vehicle is stopped in tandem with the other vehicle.

8. The parking assist system according to claim 1, wherein
the electronic control unit is configured to determine whether the vehicle is located in a place in which the vehicle is permitted to be stopped at the position at which the vehicle overlaps with the obstacle, and
the electronic control unit is configured to, when it is determined that the vehicle is located in the place in which the vehicle is permitted to be stopped at the position at which the vehicle overlaps with the obstacle, set the target position to the position at which the vehicle overlaps with the obstacle.

9. The parking assist system according to claim 2, wherein
the electronic control unit is configured to determine whether the vehicle is located in a place in which the vehicle is permitted to be stopped at the position at which the vehicle overlaps with the obstacle, and
the electronic control unit is configured to, when it is determined that the vehicle is located in the place in which the vehicle is permitted to be stopped at the position at which the vehicle overlaps with the obstacle, set the target position to the position at which the vehicle overlaps with the obstacle.

10. The parking assist system according to claim 3, wherein
the electronic control unit is configured to determine whether the vehicle is located in a place in which the vehicle is permitted to be stopped at the position at which the vehicle overlaps with the obstacle, and
the electronic control unit is configured to, when it is determined that the vehicle is located in the place in which the vehicle is permitted to be stopped at the position at which the vehicle overlaps with the obstacle, set the target position to the position at which the vehicle overlaps with the obstacle.

11. The parking assist system according to claim 4, wherein
the electronic control unit is configured to determine whether the vehicle is located in a place in which the vehicle is permitted to be stopped at the position at which the vehicle overlaps with the obstacle, and
the electronic control unit is configured to, when it is determined that the vehicle is located in the place in which the vehicle is permitted to be stopped at the position at which the vehicle overlaps with the obstacle, set the target position to the position at which the vehicle overlaps with the obstacle.

12. The parking assist system according to claim 1, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

13. The parking assist system according to claim 2, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

14. The parking assist system according to claim 3, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

15. The parking assist system according to claim 4, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

16. The parking assist system according to claim 5, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

17. The parking assist system according to claim 6, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

18. The parking assist system according to claim 7, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

19. The parking assist system according to claim 8, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

20. The parking assist system according to claim 9, wherein
the electronic control unit is configured to calculate a moving path to the target position of the vehicle, and
the electronic control unit is configured to, when the target position is set to the position at which the vehicle overlaps with the obstacle, calculate the moving path along which the vehicle is steered at a position at which a wheel of the vehicle is spaced apart from the obstacle.

* * * * *